W. A. BADGER.
CARRIER ATTACHMENT FOR HAY CARS.
APPLICATION FILED JULY 22, 1909.
945,258.
Patented Jan. 4, 1910.
2 SHEETS—SHEET 2.
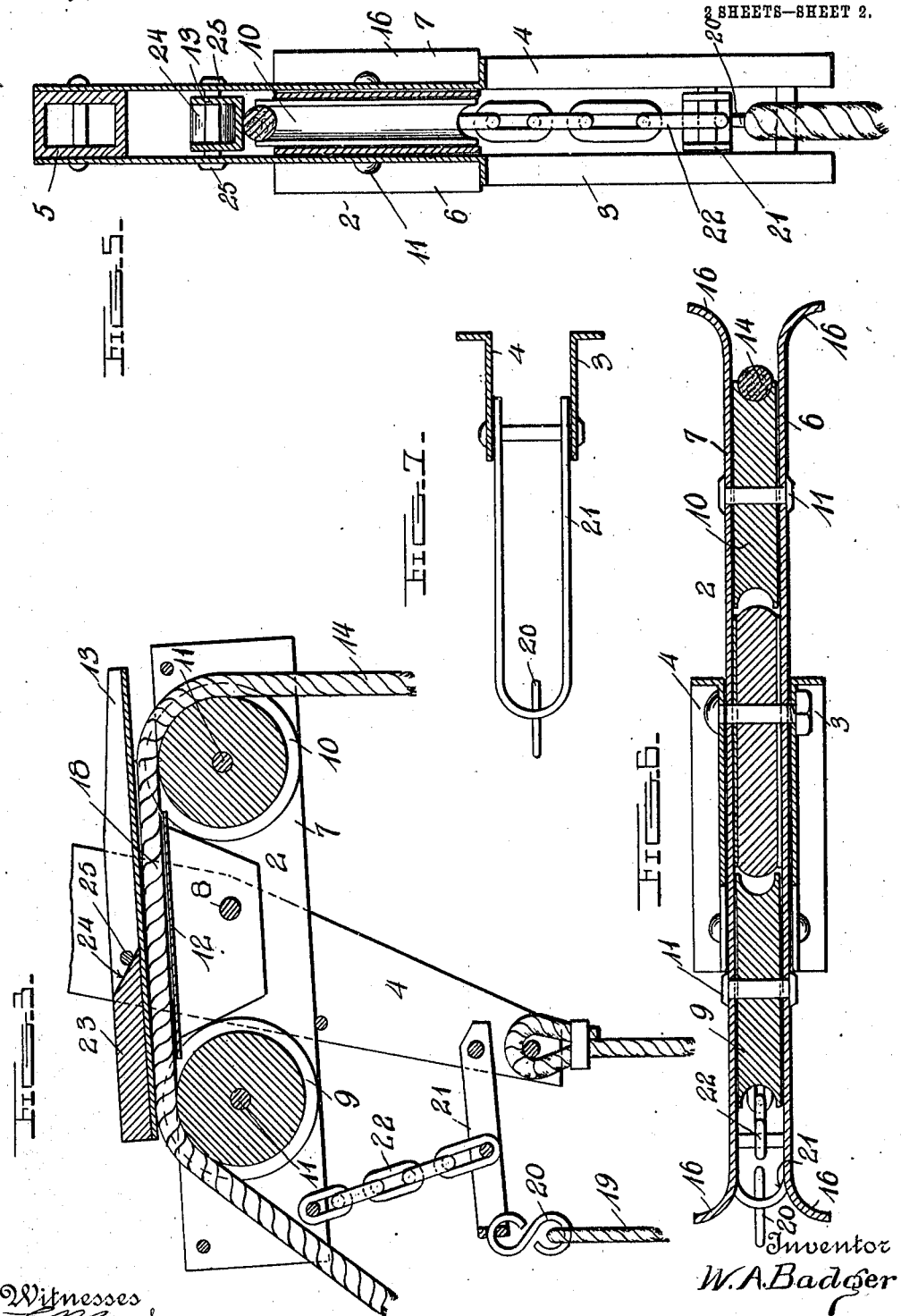

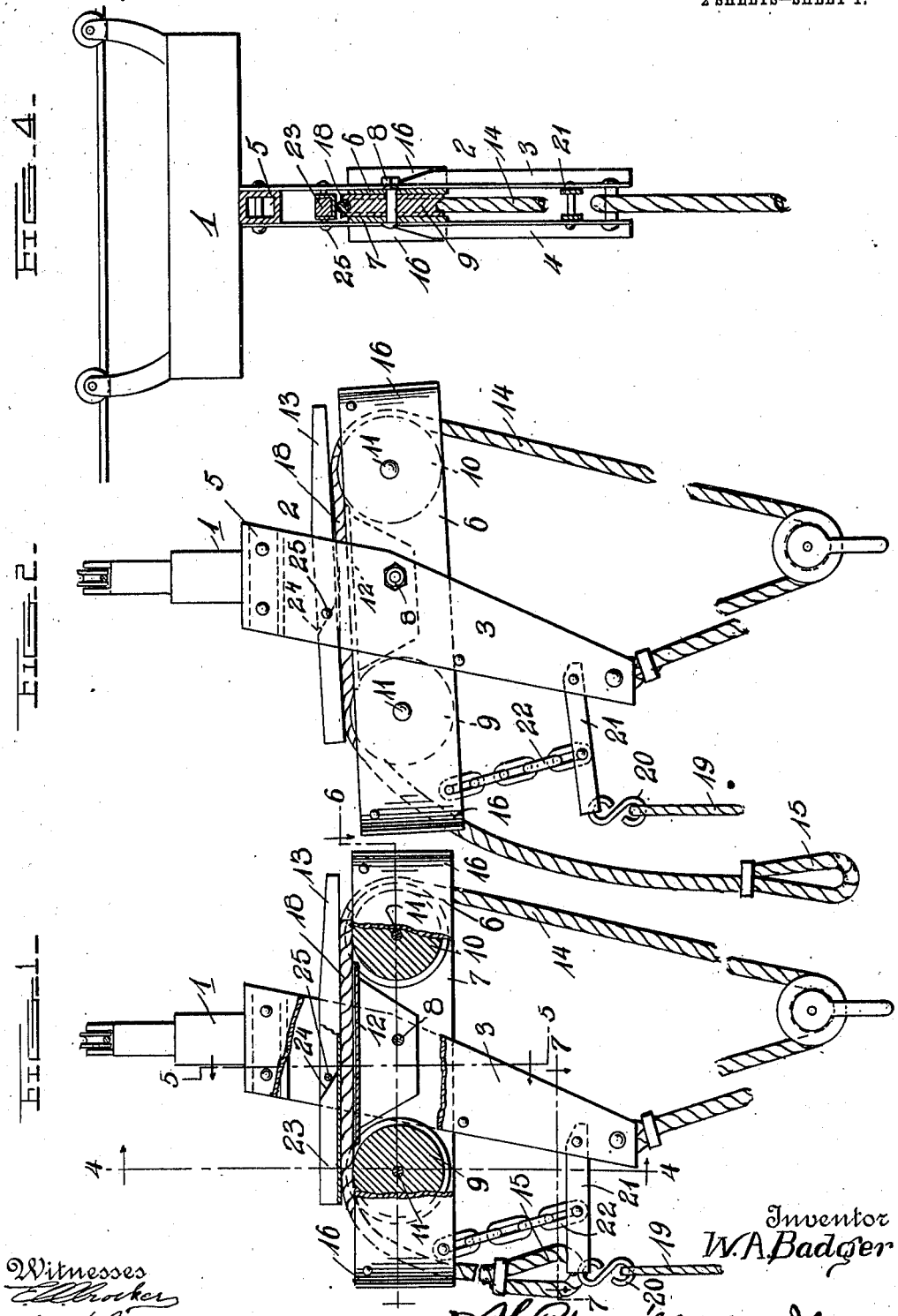

UNITED STATES PATENT OFFICE.

WALTER A. BADGER, OF BELLEFONTAINE, OHIO.

CARRIER ATTACHMENT FOR HAY-CARS.

945,258.  Specification of Letters Patent.  Patented Jan. 4, 1910.

Application filed July 22, 1909. Serial No. 509,006.

*To all whom it may concern:*

Be it known that I, WALTER A. BADGER, a citizen of the United States, residing at Bellefontaine, in the county of Logan and State of Ohio, have invented certain new and useful Improvements in Carrier Attachments for Hay-Cars; and I do declare the following to be a full, clear, and exact description of the invention, such as will enable others skilled in the art to which it appertains to make and use the same.

This invention relates to a carrier attachment for hay cars and has for its object to provide an attachment of this kind which may be readily applied to a hay car of any modern type, or to any old style hay car now in use, making of it a modern cross draft car.

With the foregoing and other objects in view, the invention consists of certain novel features of construction, combination and arrangement of parts, as will be more fully described and particularly pointed out in the appended claims.

In the accompanying drawings, Figure 1 is a side elevation, partly in section, of the attachment as applied to a hay car, with the clamping plates in rope engaging position; Fig. 2 is a similar view of the attachment with the upper clamping plate in releasing position; Fig. 3 is a central longitudinal section of Fig. 2; Figs. 4 and 5 are vertical transverse sections taken on lines 4—4 and 5—5, respectively, of Fig. 1, Fig. 6 is a horizontal section taken on line 6—6 of Fig. 1; and Fig. 7 is a horizontal section on line 7—7 of said figure.

Referring to the drawings for a more particular description of the invention, 1 indicates the hay car and 2, the attachment which is applied thereto. This attachment comprises a pair of corresponding vertical frame plates 3 and 4, the upper ends of which are riveted or otherwise attached to the opposite sides of the hollow securing block 5 carried by the body of the car. The frame plates 3 and 4, are disposed at a forward inclination. Pivotally mounted between the frame plates 3 and 4, is a wheel carrying frame consisting of a pair of laterally spaced corresponding plates 6 and 7. These plates are pivoted upon a bolt 8, which extends through the frame plates 3 and 4, at a point eccentric to the center thereof and may be connected at opposite ends by any suitable means. A pair of grooved wheels or pulleys 9 and 10, are revolubly mounted between the plates 6 and 7, upon rivets 11 which extend therethrough and are arranged with their centers in alinement with the pivot bolt 8. A fixed clamping plate 12 is secured between the plates 6 and 7, by rivets or other similar fastening means, while a second or upper clamping plate 13 is pivoted between the plates 6 and 7, and is adapted to clamp the carrier rope 14. This rope, as shown, is connected at one end with the lower end of the frame plates 3 and 4, and after passing downward through one or more hoisting pulleys, passes up over the wheels 9 and 10 and is provided at its free end with a loop 15, to which the lifting force is applied. The opposite ends of the plates 6 and 7, are turned outwardly, as at 16, so as to not cut the rope.

It is to be particularly observed that the pivot for the upper clamping plate lies at a point forward of a perpendicular line drawn through the pivot bolt 8, so that the load upon the carrier rope causes the upper clamping plate to assume a position parallel with the upper edges of the plates 6 and 7 and clamp the entire portion 18 of the rope lying between the centers of the wheels 9 and 10, when the lifting force is released, which provides for a long straight grip upon the carrier rope, and thus prevents any slipping of the latter. To release the upper clamping plate 13, from the carrier rope, the operator pulls down upon the releasing cord 19 which is connected by the link 20 with the bail-shaped lever 21, having its ends pivoted between the lower ends of the frame plates 3 and 4, and connected intermediately of its ends by the chain links 22, with the plates 6 and 7.

When the operator pulls upon the releasing cord, as heretofore stated, the adjacent ends of the plates 6 and 7 are swung down upon the pivot 8, while the upper clamping plate is moved farther away from the upper edges of the plates 6 and 7 and the wheels 9 and 10, and permits the ready passage of the rope between the clamping plates. The upper clamping plate is preferably of U-shaped form in cross section, and is provided at one end with a longitudinal weight 23, the inner end of which is beveled, as at 24, to engage the limiting pin 25. By this means, the downward swinging movement of the weighted end of the upper clamping plate is limited so that when in releasing position, said weighted end will not bear upon the carrier rope and thus cause unnecessary friction and wear upon the same. It will be observed that by connecting the releasing cord with the adjacent ends of the frame plates 6 and 7, as shown, quite a leverage is provided, and the adjacent ends of said plates may be easily swung down.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:—

1. A carrier attachment for hay cars comprising a pair of substantially vertical supporting plates, a wheel-carrying frame pivotally mounted between the same, a fixed clamping plate in said frame, a pivoted clamping plate between the supporting plates, the pivot for said upper clamping plate lying at a point forward of a perpendicular line drawn through the pivot for the wheel carrying frame, and a carrier rope passing between said clamping plates.

2. A carrier attachment for hay cars comprising a pair of substantially vertical supporting plates, a wheel carrying frame pivotally mounted between the same, a fixed clamping plate in said frame, a pivoted clamping plate between the supporting plates, the pivot for said upper clamping plate lying at a point forward of a perpendicular line drawn through the pivot for the wheel carrying frame, a carrier rope passing between said clamping plates, and a releasing cord connected with one end of the wheel carrying frame to swing said end down in order to release the carrier rope.

3. A carrier attachment of the class described comprising a pair of substantially vertical supporting plates, a wheel carrying frame pivoted therebetween, wheels at opposite ends of said frame, a fixed clamping plate in the frame, a carrier rope connected at one end with the lower ends of the supporting plates and passing downward through one or more hoisting pulleys and then up and over said wheels, an upper clamping plate pivoted between the supporting plates and adapted to clamp the entire, straight, portion of the carrier rope lying between the centers of the frame wheels, the pivot for the upper clamping plate lying at a point forward of a vertical line passing through the center of the pivot for the wheel carrying frame, whereby as the wheel carrying frame is turned on its pivot, the upper clamping plate is moved into and out of clamping position, and means to swing one end of the wheel carrying frame downwardly.

4. A carrier attachment of the class described comprising a pair of substantially vertical supporting plates, a wheel supporting frame pivotally mounted therebetween, wheels at opposite ends of said frame, a fixed clamping plate in the frame, an upper clamping plate of approximately U-shape form in cross section, pivoted between the supporting plates and adapted to clamp the entire, straight portion of the carrier rope lying between the centers of said wheels, the pivot for the upper clamping plate lying forward of a vertical line passing through the pivot for the wheel carrying frame, whereby said clamping plate is swung into and out of clamping engagement with the carrier rope as the carrier frame is turned upon its pivot, a weight arranged at the pivoted end of the upper clamping plate and provided with a beveled inner end attached to engage the pivot of said clamping plate, a pin to limit the downward swinging movement thereof, and means to swing one end of the wheel carrying frame downwardly.

5. A carrier attachment of the class described comprising a pair of supporting plates, a wheel carrying frame pivotally mounted therebetween, a fixed clamping plate, an upper pivoted clamping plate, a carrier rope connected with the supporting plates and passing over said wheels, and means for swinging one end of the wheel carrying frame downwardly, said means comprising a lever pivoted to the lower ends of the supporting plates, a flexible connection between said lever and one end of the frame, and a releasing cord connected with the free end of the lever.

In testimony whereof I have hereunto set my hand in presence of two subscribing witnesses.

WALTER A. BADGER.

Witnesses:
GERTRUDE L. McNEFF,
HAZEL E. WELLS.